United States Patent [19]

Amano et al.

[11] Patent Number: 5,166,282

[45] Date of Patent: Nov. 24, 1992

[54] PROCESS FOR PRODUCING VINYL CHLORIDE POLYMER WITH ANTIOXIDANT

[75] Inventors: Tadashi Amano, Kawasaki; Shigehiro Hoshida, Ibaraki, both of Japan

[73] Assignee: Shin-Etsu Chemical Co., Ltd., Tokyo, Japan

[21] Appl. No.: 508,351

[22] Filed: Apr. 12, 1990

[30] Foreign Application Priority Data

Apr. 14, 1989 [JP] Japan .................................. 1-94916

[51] Int. Cl.$^5$ .............................................. C08F 2/20
[52] U.S. Cl. ...................................... 526/209; 526/89; 526/210; 526/212; 526/322; 526/323.2
[58] Field of Search .............. 526/209, 210, 211, 212, 526/220, 214

[56] References Cited

U.S. PATENT DOCUMENTS 4,482,684  11/1984  Gardner .................................. 526/84
4,816,539   3/1989  Watanabe .............................. 526/320

*Primary Examiner*—Christopher Henderson
*Attorney, Agent, or Firm*—McAulay Fisher Nissen Goldberg & Kiel

[57] ABSTRACT

A process for producing a vinyl chloride polymer for matted moldings which comprises performing the suspension polymerization of vinyl chloride monomer or a mixture of vinyl monomers composed mainly of vinyl chloride in an aqueous medium, in the presence of (A) 0.01 to 3 parts by weight of a polyfunctional monomer having two or more ethylenic double bonds in the molecule and (B) 0.00005 to 0.01 part by weight of antioxidant, thereby yielding a vinyl chloride resin composed of 5 to 90% by weight of tetrahydrofuran-insoluble gel fraction, with the remainder being tetrahydrofuran-solubles.

3 Claims, No Drawings

1

PROCESS FOR PRODUCING VINYL CHLORIDE POLYMER WITH ANTIOXIDANT

BACKGROUND OF THE INVENTION

1. Field of the Invention

The present invention relates to a process for producing a vinyl chloride polymer for matted moldings. More particularly, it is concerned with a process for producing a vinyl chloride polymer as a molding material suitable for high-quality matted moldings having a minimum of fish-eyes.

2. Description of the Prior Art

There is a known process for producing a vinyl chloride polymer for matted moldings, as disclosed in Japanese Patent Laid-open No. 134793/1979. This conventional process was developed with an emphasis on the matte effect and creep properties of the moldings prepared from the vinyl chloride polymer. Therefore, almost no attempts were made to reduce fish-eyes that appear on the moldings prepared from the vinyl chloride polymer. Although fish-eyes adversely affect the appearance and quality of matted moldings, they have been regarded as inevitable for matted moldings because the vinyl chloride polymer for matted moldings undergoes, during polymerization, the step of forming gel which gives rise to the matte surface.

With the recent expansion of their applications, there has arisen a strict requirement for the quality of vinyl chloride polymers for matted moldings. It is desirable that the vinyl chloride polymer for film and pipe should contain as few fish-eyes as possible.

SUMMARY OF THE INVENTION

The present invention was completed to meet the above-mentioned requirements. Accordingly, it is an object of the present invention to provide a process for producing a vinyl chloride polymer for high-quality matted moldings with a minimum of fish-eyes.

To achieve this object, the present inventors carried out a series of researches which led to the finding that it is possible to produce a vinyl chloride polymer for matted moldings with a minimum of fish-eyes by the process which comprises performing the suspension polymerization of vinyl chloride monomer or a mixture of vinyl monomers composed mainly of vinyl chloride in an aqueous medium, in the presence of (A) 0.01 to 3 parts by weight of a polyfunctional monomer having two or more ethylenic double bonds in the molecule and (B) 0.00005 to 0.01 part by weight of an antioxidant for 100 parts by weight of vinyl chloride monomer or the mixture of vinyl monomers, thereby yielding a vinyl chloride resin composed of 5 to 90% by weight of tetrahydrofuran-insoluble gel fraction, with the remainder being tetrahydrofuran-solubles.

It has been known that the suspension polymerization of vinyl chloride is performed in water containing an antioxidant and a suspending agent, so that the polymerization reaction is delayed or terminated and the antioxidant is uniformly dispersed into the vinyl chloride resin. (See Japanese Patent Laid-open No. 218711/1988). However, it is the present inventors' new finding that an antioxidant effectively prevents the formation of fish-eyes during the polymerization of a vinyl chloride polymer for matted moldings, if it is used for the production of a vinyl chloride polymer for matted moldings containing 5 to 90% by weight of tetrahydrofuran-insoluble gel fraction, from vinyl chloride in combination with a polyfunctional monomer having two or more ethylenic double bonds in the molecule.

Incidentally, the term "tetrahydrofuran-soluble gel fraction" means the gel fraction insoluble in tetrahydrofuran which is measured by the method given in Example explained later. The term "tetrahydrofuran-solubles" means any remaining fraction which is soluble in tetrahydrofuran.

DETAILED DESCRIPTION OF THE INVENTION

According to the process of the present invention, a vinyl chloride polymer for matted moldings is produced by the suspension polymerization of vinyl chloride or a mixture of vinyl monomers composed mainly of vinyl chloride, which is performed in the presence of (A) a polyfunctional monomer having two or more ethylenic double bonds in the molecule and (B) an antioxidant.

Component (A), which is a polyfunctional monomer having two or more ethylenic double bonds in the molecule, includes the following.

i Diallyl esters of phthalic acid such as diallyl isophthalate and diallyl terephthalate.

ii Diallyl and divinyl esters of ethylenically unsaturated dibasic acids such as diallyl maleate, diallyl fumarate, diallyl itaconate, divinyl itaconate, and divinyl fumarate.

iii Diallyl and divinyl esters of saturated dibasic acids such as diallyl adipate, divinyl adipate, diallyl azelate, and diallyl cebacate.

iv Divinyl ethers such as diallyl ether, triallyl cyanurate, triallyl isocyanurate, triallyltrimellitate, ethyleneglycol divinyl ether, n-butanediol divinyl ether, and octadecane divinyl ether.

v Vinyl and allyl esters of acrylic acid or methacrylic acid such as vinyl acrylate, vinyl methacrylate, allyl acrylate, and allyl methacrylate.

vi Diacryl and dimethacryl esters of polyhydric alcohols such as ethylene glycol dimethacrylate, diethylene glycol methacrylate, triethylene glycol dimethacrylate, diethylene glycol diacrylate, triethylene glycol diacrylate, and polyethylene glycol diacrylate.

vii Triacryl and trimethacryl esters of polyhydric alcohols such as trimethylolpropane trimethacrylate, trimethylolethane trimethacrylate, trimethylolpropane triacrylate, trimethylolethane triacrylate, and tetramethylolmethane acrylate.

viii Low-molecular weight polymers (having a molecular weight of 200 to 3000) containing unsaturated bonds such as bismethacryloyloxyethylene phthalate, 1,3,5-triacryloylhexahydrotriazine and 1,2-butadiene homopolymer.

They may be used alone or in combination with one another.

The polyfunctional monomer having two or more ethylenic double bonds in the molecule should be used in an amount of 0.01 to 3 parts by weight, preferably 0.1 to 1 part by weight, for 100 parts by weight of vinyl chloride or a mixture of vinyl monomers composed mainly of vinyl chloride. With an amount less than 0.01 part, the polyfunctional monomer does not produce the matting effect as desired. With an amount in excess of 3 parts by weight, the polyfunctional monomer gives rise to a polymer which is poor in processability.

The polyfunctional monomer may be added to the polymerization system at any time. For example, it may be added all at once before the start of polymerization;

it may be added partly before the start of polymerization, with the remainder being added in portions during polymerization; or it may be added in portions or continuously during polymerization.

Component (B), which is an antioxidant, includes the following which are commonly used as a terminator for the polymerization of vinyl chloride.

i Phenol compounds such as 2,2-di(4'-hydroxyphenyl)propane, hydroquinone, p-methoxyphenol, t-butylhydroxy-anisole, n-octadecyl-3-(4-hydroxy-3,5-di-t-butyl-phenyl)propionate, 2,5-di-t-butylhydroquinone, 4,4'-butylidenebis(3-methyl-6-t-butylphenol), 3,5-di-t-butyl-4-hydroxytoluene, 2,2'-methylene-bis(4-ethyl-6-t-butylphenol), triethyleneglycol-bis-[3-(3-t-butyl-5-methyl-4-hydroxyphenyl)propionate], pentaerythritoltetrakis[3-(3,5-di-t-butyl-4-hydroxy-phenyl) propionate], 2,6-di-t-butyl-4-methylphenol, t-butylcatechol, 4,4-thiobis(6-t-butyl-m-cresol), tocopherol, and nordihydroguaiaretic acid.

ii Aromatic amine compounds such as phenylnaphthylamine, N,N'-diphenyl-p-phenylenediamine, and 4,4'-bis(dimethylbenzyl) diphenylamine.

iii Semicarbazide; hydrofluoride, hydrochloride, nitrate, acid sulfate, sulfate, chlorate, formate, acid oxalate, acid maleate, and maleate of semicarbazide; derivatives of semicarbazide such as 1-acetylsemicarbazide, 1-chloroacetylsemicarbazide, 1-dichloroacetyl-semicarbazide, 1-benzoylsemicarbazide, and semicarbazone.

iv Amine compounds such as carbohydrazide, thiosemicarbazide, thiosemicarbazone derivatives, thiocarbazide, and thiocarbazide derivatives.

v Nitro compounds such as nitroanisole, N-nitrosodiphenylamine, nitroaniline, and N-nitrosophenylhydroxylamine aluminum salt.

vi Phosphorus compounds such as triphenyl phosphite, diphenylisodecyl phosphite, phenyldiisodecyl phosphite, 4,4'-butylidene-bis(3-methyl-6-t-butylphenyl-di-tri-decyl)phosphate, cyclic neopentanetetrayl-bis-(octa-decyl)phosphite, tris(nonylphenyl)phosphite, and tris(dinonyl)phosphite.

vii Unsaturated hydrocarbon compounds such as styrene, 1,3-hexadiene, and methyl styrene.

viii Thio compounds such as dilauryl thiodipropionate, dimyristylthiopropionate, distearylthiodipropionate, dodecylmercaptan, 1,3-diphenyl-2-thiourea.

They may be used alone or in combination with one another.

Preferable among the above-mentioned antioxidants are t-butylhydroxyanisole, 2-t-butylhydroquinone, and 2,6-di-t-butyl-4-methylphenol, which neither color the products of vinyl chloride resin nor form scale on the walls of the polymerization vessel.

The above-mentioned antioxidant should be used in an amount of 0.00005 to 0.01 part by weight, preferably 0.0003 to 0.005 part by weight, for 100 parts by weight of vinyl chloride or a mixture of vinyl monomers composed mainly of vinyl chloride. With an amount less than 0.00005 part by weight, the antioxidant does not prevent the formation of fish-eyes. With an amount in excess of 0.01 part by weight, the antioxidant undesirably extends the polymerization time.

There are no restrictions on the method of adding the above-mentioned antioxidant. It may be added directly into the aqueous medium for polymerization. It may be added to the polymerization system in the form of solution in an adequate solvent such as methanol, ethanol, toluene, benzene, hexane, and isoparaffin. It may be added to the polymerization system in the form of dispersion containing partially saponified polyvinyl alcohol, methyl cellulose, or emulsifier. The latter two methods are preferable. The preferred concentrations of the antioxidant in solution or aqueous dispersion are 5 to 50% by weight.

The antioxidant should preferably be added to the polymerization system before the start of polymerization.

According to the present invention, the vinyl chloride polymer for matted moldings is prepared from vinyl chloride or a mixture of vinyl chloride (more than 50% by weight) and a copolymerizable vinyl monomer (or comonomer). Examples of the comonomer include vinyl esters such as vinyl acetate and vinyl propionate; acrylic esters and methacrylic esters such as methyl acrylate and ethyl acrylate; olefins such as ethylene and propylene; maleic anhydride; acrylonitrile; styrene; and vinylidene chloride.

According to the present invention, the above-mentioned monomer undergoes suspension polymerization in the presence of (A) the above-mentioned polyfunctional monomer having two or more ethylenic double bonds in the molecule and (B) the abovementioned antioxidant. The suspension polymerization may be carried out in any manner by the aid of a commonly used dispersing agent and polymerization initiator.

Examples of the dispersing agent include water-soluble cellulose ethers such as methyl cellulose, hydroxyethyl cellulose, hydroxypropyl cellulose, and hydroxypropylmethyl cellulose; partially saponified polyvinyl alcohol; acrylic polymer; water-soluble polymer such as gelatin; oil-soluble emulsifiers such as sorbitan monolaurate, sorbitan trioleate, glycerin tristearate, and ethylene oxide-propylene oxide block copolymer; and water-soluble emulsifiers such as polyoxyethylenesorbitan monolaurate, polyoxyethyleneglycerin oleate, and sodium laurate. They may be used alone or in combination with one another.

Examples of the polymerization initiator include percarbonate compounds such as diisopropyl peroxydicarbonate, di-2-ethylhexyl peroxydicarbonate, and diethoxyethyl peroxydicarbonate; perester compounds such as t-butyl peroxypivalate, t-hexyl peroxypivalate, t-butyl peroxyneodecanate, and α-cumyl peroxyneodecanate; peroxides such as acetylcyclohexyl sulfonyl peroxide, 2,4,4-trimethylpentyl-2-peroxyphenoxy acetate, and 3,5,5-trimethylhexanoyl peroxide; azo compounds such as azobis-2,4-dimethylvaleronitrile, and azobis(4-methoxy-2,4-dimethylvaleronitrile); and potassium persulfate, ammonium persulfate, ammonium persulfate, and hydrogen peroxide. They may be used alone or in combination with one another.

The blending amount of the dispersing agent should preferably be in the range of 0.01 to 1 part by weight per 100 parts by weight of vinyl chloride or the mixture of vinyl monomers.

The blending amount of the polymerization initiator should preferably be in the range of 0.01 to 1 part by weight per 100 parts by weight of vinyl chloride or the mixture of vinyl monomers.

The polymerization system may contain a polymerization regulator, chain transfer agent, pH regulator, gel improver, antistatic agent, and scale inhibitor, according to need.

Polymerization may be performed by charging the polymerization vessel with an aqueous medium, vinyl chloride monomer and optional comonomer, dispersing agent, and polymerization initiator as much as necessary in the customary manner. Polymerization temperature may be in the range of 20°–80° C., which is normal for the polymerization of vinyl chloride.

According to the present invention, the vinyl chloride polymer for matted moldings should contain 5 to 90%, preferably 10 to 50% by weight, of tetrahydrofuran-insoluble gel fraction, with the remainder being tetrahydrofuran-solubles. With gel fraction less than 5% by weight, the vinyl chloride polymer yields moldings with a poor matted surface. With gel fraction in excess of 90% by weight, the vinyl chloride polymer is poor in processability.

The vinyl chloride polymer for matted moldings which is obtained as mentioned above is of high quality with a minimum of fish-eyes. It may be used alone or in combination with other thermoplastic resin or rubber (such as vinyl chloride resin, polyethylene, ABS resin, urethane resin, acrylic resin, acrylonitrile-butadiene rubber (NBR), and chloroprene rubber (CR)) and an optional processing aid such as a plastisizer, to produce matted moldings, especially high-quality film and pipe.

As mentioned above, the process of the present invention prevents the formation of fish-eyes during polymerization, thereby giving rise to a high-quality vinyl chloride resin for matted moldings with a minimum of fish-eyes.

The invention will be described in more detail with reference to the following examples and comparative examples, which are not intended to restrict the scope of the invention.

EXAMPLES 1 TO 7

A 130-liter stainless steel polymerizer was charged with 60 kg of deionized water, 30 g of water-soluble partially saponified polyvinyl alcohol, 15 g of di-2-ethyl-hexyl peroxycarbonate, a prescribed amount of polyfunctional monomer, and a prescribed amount of antioxidant. (The amount and kind of the last two components are shown in Table 1.)

The polymerizer was evacuated to 100 mmHg and then charged with 30 kg of vinyl chloride. The contents were heated to 62° C., with stirring, by passing hot water through the jacket of the polymerizer. This temperature was kept while polymerization proceeded. When the pressure in the polymerizer decreased to 6.0 kg/cm$^2$ G, the polymerization reaction was terminated, and unreacted monomers were recovered. The resulting polymer slurry was discharged from the polymerizer, followed by dehydration and drying. Thus there was obtained a vinyl chloride polymer.

COMPARATIVE EXAMPLE

The same procedure as in Examples mentioned above was repeated to give a vinyl chloride resin, except that the antioxidant was not added.

The vinyl chloride polymers obtained in Examples and Comparative Example were tested for fish-eyes and tetrahydrofuran-insoluble gel fraction in the following manner. Fish-eyes Each sample was compounded according to the following formulation.

| Vinyl chloride polymer obtained above | 50 parts by weight |
| Vinyl chloride homopolymer* | 50 parts by weight |
| DOP (dioctyl phthalate) | 30 parts by weight |
| ESO (epoxidized soybean oil) | 5.0 parts by weight |
| Barium-zinc stabilizer | 2.0 parts by weight |
| Titanium oxide | 0.5 part by weight |
| Carbon black | 0.1 part by weight |

*TK-800 (suspension polymer) made by Shin-Etsu Chemical Co., Ltd.

The resulting compound (50 g) was mixed at 150° C. for 5 minutes using a 6 inch mixing roll, and then formed into a sheet, 15 cm wide and 0.5 mm thick. This sheet was examined to count the number of transparent particles per 100 cm$^2$. The counted number was used as an index of fish-eyes. Tetrahydrofuran-insoluble gel fraction The vinyl chloride polymer (1 g) was dissolved with stirring in 100 ml of tetrahydrofuran (THF) at 60° C. The resulting solution was allowed to stand for 24 hours, and the supernatant liquid (10 ml) was collected. After evaporation to dryness, the residue (polymer) was weighed, and the amount of THF-insoluble gel fraction was calculated according to the following formula.

THF-insoluble gel fraction (wt %) =

$$100 - \frac{\text{Residue (g)} \times 10}{1 \text{ (g)}} \times 100$$

The results are shown in Table 1.

TABLE 1

| | Antioxidant | | |
| | Name | Amount (parts) | Form |
|---|---|---|---|
| Example 1 | t-Butylhydroxyanisole | 0.001 | — |
| Example 2 | " | 0.002 | 50% aq. dispersion*1 |
| Example 3 | Di-t-butylhydroquinone | 0.0005 | — |
| Example 4 | " | 0.001 | 50% aq. dispersion*2 |
| Example 5 | " | 0.001 | 50% methanol soln. |
| Example 6 | 2,6-di-butyl-4-methylphenol | 0.002 | — |
| Example 7 | 2,6-di-butyl-4-methylphenol | 0.004 | 50% aq. dispersion*3 |
| Comparative Example | — | — | — |

| | Polyfunctional monomer | | | THF-insoluble gel fraction (wt %) |
| | Name | Amount (parts) | Fish-eyes | |
|---|---|---|---|---|
| Example 1 | Diallylphthalate | 0.3 | 8 | 19 |
| Example 2 | " | 0.3 | 1 | 20 |
| Example 3 | " | 0.5 | 11 | 29 |
| Example 4 | " | 0.5 | 1 | 31 |
| Example 5 | " | 0.5 | 2 | 31 |
| Example 6 | 1,6-hexaglycol diacrylate | 0.5 | 14 | 21 |
| Example 7 | 1,6-hexaglycol diacrylate | 0.5 | 1 | 22 |
| Comparative Example | 1,6-hexaglycol diacrylate | 0.5 | 40 | 22 |

*1 0.2% aqueous solution of water-soluble polyvinyl alcohol
*2 0.2% aqueous solution of polyoxyethylene sorbitan monolaurate
*3 0.2% aqueous solution of polyoxyethylene sorbitan monolaurate

What is claimed is:

1. A process for producing a vinyl chloride polymer for matted moldings which comprises performing the suspension polymerization of vinyl chloride monomer or a mixture of vinyl monomers composed mainly of vinyl chloride in an aqueous medium, in the presence of
(A) 0.01 to 3 parts by weight of a polyfunctional monomer having to or more ethylenic double bonds in the molecule, and
(B) 0.00005 to 0.01 parts by weight of an antioxidant for 100 parts by weight of said vinyl chloride monomer or mixture of vinyl monomers, said antioxidant being selected from the group consisting of 6-butylhydroxyanisole, 2-t-butylhydroquinone and 2,6-di-butyl-4-methylphenol, thereby yielding a vinyl chloride resin composed of 5 to 90% by weight of tetrahydrofuran-insoluble gel fraction, with the remainder being tetrahydrofuran-solubles.

2. The process of claim 1 wherein the amount of the polyfunctional monomer is in the range of 0.1 to 1 part by weight for 100 parts by weight of said vinyl chloride monomer or mixture of vinyl monomers.

3. The process of claim 1 wherein the amount of the antioxidant is in the range of 0.0003 to 0.005 part by weight of said vinyl chloride monomer or mixture of vinyl monomers.

* * * * *